United States Patent [19]

Galand et al.

[11] Patent Number: 5,487,064
[45] Date of Patent: Jan. 23, 1996

[54] NETWORK LAYER PACKET STRUCTURE

[75] Inventors: Claude Galand, Cagnes sur Mer; Gerald Lebizay, Vence, both of France

[73] Assignee: International Business Machines Corporation, Armonk, N.Y.

[21] Appl. No.: 251,073

[22] Filed: May 31, 1994

[30] Foreign Application Priority Data

Jun. 3, 1993 [EP] European Pat. Off. ............ 93480068

[51] Int. Cl.$^6$ .................................................. H04L 12/56
[52] U.S. Cl. ..................... 370/60; 370/94.1; 370/94.2
[58] Field of Search ........................... 370/94.1, 94.2, 370/60, 60.1, 58.1–58.3, 85.7, 85.9, 85.5, 85.11, 85.12, 67, 61, 66, 95.1; 340/825.05

[56] References Cited

U.S. PATENT DOCUMENTS

| | | | |
|---|---|---|---|
| 4,827,411 | 5/1989 | Arrowood et al. | 364/300 |
| 4,884,263 | 11/1989 | Suzuki | 370/60 |
| 4,991,172 | 2/1991 | Cidon et al. | 370/94.1 |
| 5,051,985 | 9/1991 | Cidon et al. | 370/85.2 |
| 5,079,767 | 1/1992 | Perlman | 370/94.3 |

OTHER PUBLICATIONS

"Telecommunication Protocols and Design" by John D. Spragins et al pp. 323–327, 1991.

*Primary Examiner*—Wellington Chin
*Assistant Examiner*—Ajit Patel
*Attorney, Agent, or Firm*—Gerald R. Woods

[57] ABSTRACT

A packet switching communication system is improved by using a packet header structure which does not require a fixed format. The packet header comprises a chain of 2 byte command/data segments. Each command/data segment contains generic bits and a routing field. One of the generic bits (bit 1) allows the header to be extended with another command/data segment.

4 Claims, 6 Drawing Sheets

|  | 0 | 1 | 2 | 3 | 4 | 5 | 6 | 7 | |
|---|---|---|---|---|---|---|---|---|---|
| Control Byte 1 | r1 | r2 | r3 | rp | c1 | c2 | c3 | res | 1 |
| Control Byte 2 | cp1 | cp2 | cp3 | cp4 | res | res | el | res | 2 |
| Routing Byte 1 | Routing Address ||||||||  3 |
| Routing Byte 2 | Routing Address ||||||||  4 |
| Routing Byte N | Routing Address ||||||||  N+2 |
| Error Checking | LRC ||||||||  N+3 |

FIG. 3

|  | 0 | 1 | 2 | 3 | 4 | 5 | 6 | 7 | |
|---|---|---|---|---|---|---|---|---|---|
| Control Byte 1 | r1 | r2 | r3 | rp | c1 | c2 | c3 | res | 1 |
| Control Byte 2 | cp1 | cp2 | cp3 | cp4 | res | res | e1 | gx | 2 |
| Routing Byte 1 | Routing Address ||||||||  3 |
| Routing Byte 2 | Routing Address ||||||||  4 |
| CDS Byte 1/2 | gx1 | c/d | res | res | Data |||| 5 |
| CDS Byte 2/2 | Data ||||||||  6 |
| Error Checking | LRC ||||||||  7 |

| | CDS1 BASIC | CDS COPY |
|---|---|---|
| B0 | 0 | 0 |
| B1 | 0 | 0 |
| B2 | 0 | RES |
| B3 | 1 | 0 |
| B4 | 1 | |
| B5 B6 B7 | COS | |
| B8 B9 B10 B11 B12 B13 B14 B15 | label | copy id |

FIG. 7

| | NODE 1 | | NODE 2 | |
|---|---|---|---|---|
| | CDS1 BASIC | CDS EXT | CDS2 BASIC | CDS COPY |
| B0 | 0 | 0 | 0 | 0 |
| B1 | 1 | 0 | 0 | 0 |
| B2 | 1 | RES | 1 | RES |
| B3 | 1 | 1 | 1 | 0 |
| B4 | 1 | | 1 | |
| B5 B6 B7 | COS | | COS | |
| B8 B9 B10 B11 B12 B13 B14 B15 | label | label | label | copy id |

FIG. 8

|  | BIT | ANR | TREE | LABEL SWAP |
|---|---|---|---|---|
| BASIC COMMAND DATA SEGMENT (CDS) | B0<br>B1<br>B2<br>B3<br>B4 | CDS enabler<br>GX extension<br>Routing mode<br>CDS chaining<br>Copy | CDS enabler<br>GX extension<br>Routing mode<br>CDS chaining<br>Copy | CDS enabler<br>GX extension<br>Routing mode<br>CDS chaining<br>Copy |
|  | B5<br>B6<br>B7 | COS | COS | COS |
|  | B8<br>B9<br>B10<br>B11<br>B12<br>B13<br>B14<br>B15 | 8 bit ANR label | 8 bit Tree addr | 8 bit Label |
| CDS POTENTIAL EXTENSION 1 | B0<br>B1<br>B2<br>B3 | CDS enabler<br>GX extension<br>Reserved<br>CDS chaining | CDS enabler<br>GX extension<br>Reserved<br>CDS chaining | CDS enabler<br>GX extension<br>Reserved<br>CDS chaining |
|  | B4<br>B5<br>B6<br>B7<br>B8<br>B9<br>B10<br>B11<br>B12<br>B13<br>B14<br>B15 | 12 bit ANR | 12 bit Tree address | 12 bit Label |
| CDS POTENTIAL EXTENSION 2 | B0<br>B1<br>B2<br>B3 | CDS enabler<br>GX extension<br>Reserved<br>CDS chaining | CDS enabler<br>GX extension<br>Reserved<br>CDS chaining | CDS enabler<br>GX extension<br>Reserved<br>CDS chaining |
|  | B4<br>B5<br>B6<br>B7<br>B8<br>B9<br>B10<br>B11<br>B12<br>B13<br>B14<br>B15 | 12 bit ANR Label | 12 bit Tree address | 12 bit Label |

NETWORK LAYER PACKET STRUCTURE

FIELD OF THE INVENTION

This invention relates to telecommunication networks and more particularly to an improved network layer packet structure for a fast packet switching network.

BACKGROUND OF THE INVENTION

In a digital transmission network, data from a large number of users are serially transmitted from one network node to another network node, up to their respective final destinations. Due to the evolution of networks towards more and more complex mixing of sub-networks with heterogeneous architectures, it is clear that there is a future requirement to support distributed computing applications across high speed backbones that may be carrying LAN traffic, voice, video and traffic among channel-attached hosts and workstations. Perhaps the fundamental challenge for high speed networking is to minimize the processing time within each node in the network.

Packet switching is now commonly used to accommodate the bursty, multiprocess communication found in distributed computing environments. Packets are pieces of data produced by an originating user, which are prefixed with headers containing routing information that identifies the originating and destination users. Small computers, called packet switches or nodes are linked to form a network. Some of these nodes are called end nodes and provide user access to the network. Adapter circuits at each of the switching nodes adapt the packet signals for transmission or delivery to transmission links and user applications, respectively. Each node examines each header and decides where to send the packet to move it closer to its final destination.

Routing protocols or methods are used to control the routing of the packets from node to node through the transmission system. Automatic Network Routing (ANR) uses a concatenation of linked labels or identifiers for the successive legs of the packet switching route. Labels are stripped away as the packets traverses the network, always leaving the next required label at the head of the routing field. Tree Routing is defined as a connected set of network nodes and links. In such a tree, a unique tree address is used in the routing field of the packet header and the same tree address is associated with every link forming the tree. When a multicast packet reaches a packet switching node, the tree address in the packet is compared to the tree address associated with all outgoing links from the node. The packet then may be propagated from the node to one or a plurality of links for which an address match occurs. Label Swapping uses a routing field which includes a label that is looked up in a connection table maintained in each intermediate node. The connection table gives the appropriate outbound link number and also gives a new label that will be used by the next node in the route. The new label is swapped for the old label and the packet is forwarded on the appropriate outbound link.

One of the advantages of traditional packet switching networks (X25) is that when they cannot accept new traffic they produce variations in delay resulting from storing and forwarding packets, whereby traffic is not refused, but only momentarily delayed. Another advantage of packet switching networks is their ability to match different speeds of transmission, thereby allowing different types of computer systems to communicate.

Common packet switching networks use packet headers having a fixed format which means that there are a limited number of bits reserved for future functions. Therefore, if one wishes to provide for new functions, such as address extension, new routing mode, in-band specific protocol, the only solution is to set aside reserved bits and this has as consequence to ultimately use up all the reserved bits of the header.

OBJECTS OF THE INVENTION

It is therefore a principal object of the invention to provide a packet header structure which does not require a fixed format, thereby allowing future extensions.

It is another object of the invention to provide a new packet header structure allowing future extensions which permits a regular header processing and does not rely on a specific hardware.

It is a further object of the invention to provide a packet switching network for digital data packets including a header, said network comprising a plurality of switching nodes, and a plurality of transmission links interconnecting said switching nodes, each of said switching nodes comprising means for receiving a plurality of packets from connected switching nodes, switching means for selectively transferring packets from said receiving means to said transmitting means, characterized in that said header comprises a unique command/data field and a checking field.

BRIEF SUMMARY OF THE INVENTION

According to the invention this object is accomplished by incorporating a generic extension bit in the state-of-the-art or current header, thus opening the architecture to future extensions, such as address extension, new routing mode, in-band specific protocol. When set to 1, this bit means that the header is extended by an integer number of segments comprising a command field and a data field.

Further, the control bytes and the address fields of a state-of-the-art header are modified so as to comprise a chain of homogenous command/data segments.

BRIEF DESCRIPTION OF THE DRAWINGS

The invention will be described with respect to a preferred embodiment thereof, which is further shown in the drawings in which.

DETAILED DESCRIPTION OF A PREFERRED EMBODIMENT OF THE INVENTION

In any communication network, data originating with a first end user is transferred to at least a second end user along a data path that may include many multiple network nodes and links.

In a packet switching network, packets are pieces of data, which are prefixed with headers containing routing information that identifies the originating and destination users. Each node examines each header and decides where to send the packet to move it closer to its destination. Traditional packet switching networks (IP, OSI, X25) use packet headers having a fixed format.

In high speed packet switching networks, efficiency may be increased by supporting various routings for different kinds of data (voice, video, data, control traffic . . . ).

Another requirement of high speed networks is to selectively process data according to different classes of services (COS), which are generally specified in terms of probability of loss and maximum end-to-end delay. This class of service may be specified by some bits in the Network Header, which are decoded at intermediate nodes to select the buffering policy.

Figure 1:
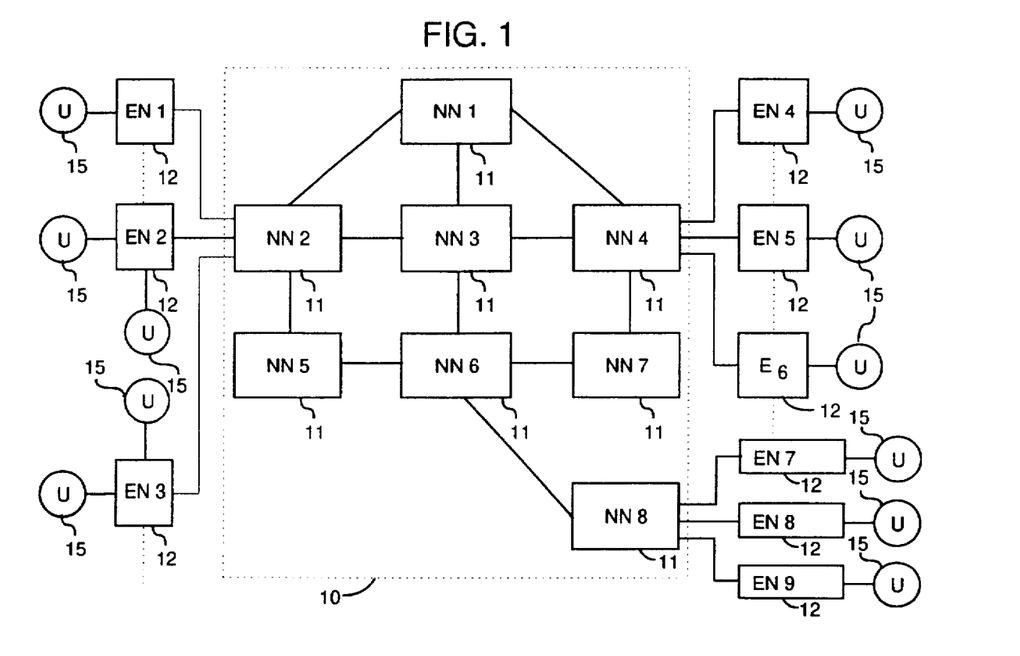
FIG. 1 is a block diagram representing a communication network within which the invention may be practiced.

FIG. 1 represents a packet-switching network 10 consisting of switching nodes and high speed transmission links between these nodes. Each of those nodes is linked to at least one other node through one or more transmission links. Switching nodes are of two types, network nodes 11 numbered (NN1–NN8) and end nodes 12 numbered (EN1–EN9) providing connections to end users 15. The switching nodes are data processing systems including transmit/receive adapters connected to the transmission links. Network nodes 11 provide data communication services to all connected nodes, network nodes and end nodes. At each node, incoming data packets are selectively routed to one or more of the outgoing communication links terminated at another node. Such routing decisions are made in response to information in the header of the data packet. They also provide certain control functions for their own or for other nodes. The control functions include, among other things, the selection and set up of communication routes between nodes, directory services and the maintenance of a network topology data base. These functions are implemented in a Control Point (CP) which is associated with every switching node. The Control Point may comprise a processor and the data bases necessary to support the calculation of optimum routes for the packets. Such network topology databases include all of the necessary information about the nodes and transmission links connected to the nodes which is to be used for routing. Moreover, such topology information is updated when new links are activated or new nodes added to the network. Such network topology information is exchanged with all other node topology databases to provide the necessary up-to-date information needed for route calculation. Such database updates are carried on packets very similar to the data packets between end users of the network.

Figure 2:
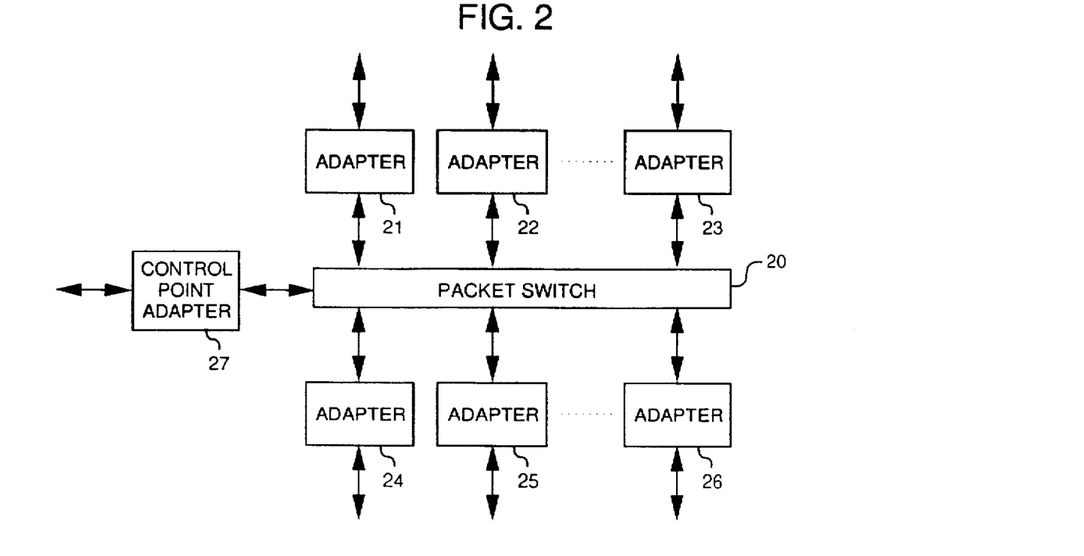
FIG. 2 is a block diagram of a typical switching node of the communication network of FIG. 1.

FIG. 2 represents a block diagram of a typical switching node of the communication network of FIG. 1. The switching node comprises a high speed packet switch 20. Packets arrive over transmission links or originate in user applications, corresponding to users 15 of FIG. 1, in end nodes via link (trunk) adapters or application (port) adapters 21, . . ., 26. Control information is sent to the node's Control Point via Control Point adapter 27. The adapters 21, . . ., 27 may include queuing circuits for queuing packets prior to or subsequent to switching in switch 20.

Figure 3:
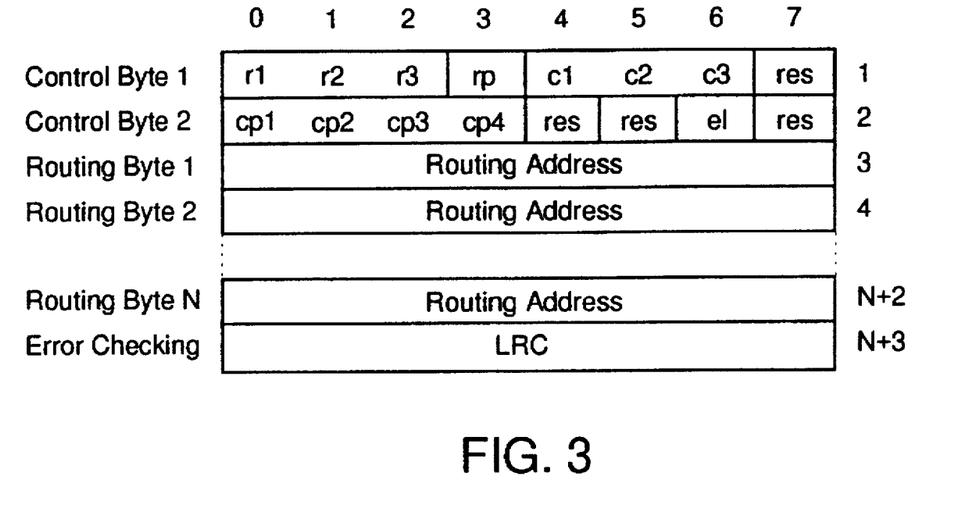
FIG. 3 shows the Network Layer header of a state-of-the art fast packet switching network.

FIG. 3, represents the Network Layer Header of a Fast Packet Switching Network, as described in U.S. patent application Ser. No. 07/978,609 filed Nov. 19, 1992, inventors: I. CIDON et al) entitled: "Function Distribution in a Packet Switched Network," which is incorporated herein by reference. The header has a variable length to support multiple routing modes, and includes the following fields:

Packet control bytes. The first control byte CB1 defines the routing modes (r1–r3), reverse path accumulation option (rp), as will be detailed later, and the intermediate buffering policy or class of service (c1–c3). The second control byte CB2 defines the copy ID for passing network control packets (e.g. route set up, maintenance, directory . . . ) to the various control functions located in the Control Point of each switching node on the route (cp1–cp4), and the presence of a transport header and of a CRC (e1) to protect the data payload. Bits marked "res" are unassigned or reserved bits.

Routing. The structure of the routing field depends on the routing mode bits (r1–r3) defined in CB1. The routing field is composed of one or more sub-fields which may be variable in length, e.g. source routing (Ref), Label Swapping. The end of the routing field is marked with a 1-byte delimiter. As a packet is routed through the network, these sub-fields may be left unchanged, modified (either adding, removing or changing bytes) or removed completely.

Checksum. The checksum byte LRC is used to check the header content.

One can make two observations:

Though several bits (res) have been reserved, this structure only permits a limited number of extensions. Traditionally at high speed, in order to efficiently implement stripping/insertion operations, the header processing relies on specific hardware. This is a constraint when this processing must be performed on different hardware.

As mentioned before, the structure of the control bytes only permits a limited number of extensions. For example, it would be desirable to support a label swapping mode by only identifying a new routing mode. However, such a mode may reflect a number of variations: Frame Relay, Asynchronous Transfer Mode (ATM), and 16, 20, or 24 bit labels.

According to the invention, this problem is resolved by using a fixed-size address for the label (16 bits), and by using a generic extension bit (gx) in the header to open the architecture to further extension. When set to 1, this bit means that the header is extended by an integer number of command/data segments (CDS). Each CDS is defined with one half-word (2 bytes), and comprises a command field (4 bits) and a data field (12 bits).

Figure 4:
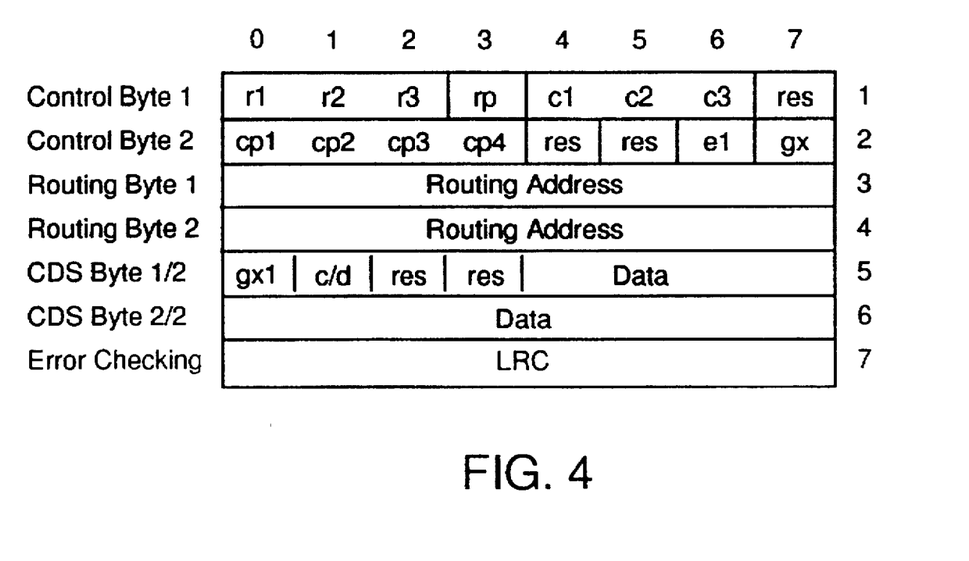
FIG. 4 shows a Network Layer header with one generic extension bit according to the invention.

FIG. 4 represents the header with the generic extension bit and one CDS. The format of the CDS is as follows:

Bit 0 (gx1): Generic extension bit. If set to 1, indicates that a second CDS follows.

Bit 1 (c/d): Command/Data bit.

A value of 0 indicates data the 12 bits in the data field represent data to be used by the previous CDS. For example, it can be a 12 bit address extension.

A value of 1 indicates a command the 12 bits in the data field represent a command to be executed by the trunk adapter; for example, send back packet, or send back information on the adapter status. In this case, this CDS is followed by one or more CDS's to carry data.

Bit 2 (res): Reserved

Bit 3 (res): Reserved

Bit 4–15: 12 bit data field.

Figure 5:
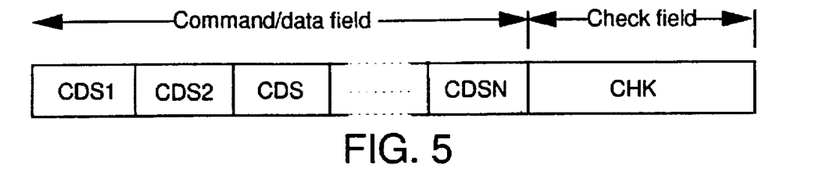
FIG. 5 shows a generic header according to the invention.

The notion of CDS can be used to define a generic header that permits the use of regular header processing. Therefore, as shown on FIG. 5, the control bytes (CB1, CB2) and the address fields of the header are restructured as a chain of homogeneous command/data segments (CDS1 ..., CDSN). The new generic header is made of a command/data field, followed by a checking field CHK. The command/data field comprises a chain of 2-byte command/data segments (CDS's).

Routing modes can be classified in two primitive classes:

The direct/explicit routing of which ANR is a typical example,

The indirect/implicit routing which includes multicast tree and label swapping. Implicit routing means that, in each node on a path, a set up phase has prepared information to be accessed by the implicit label, such as destination internal port identifier (or identifiers in case of multicast), or label for swap.

Figure 6:
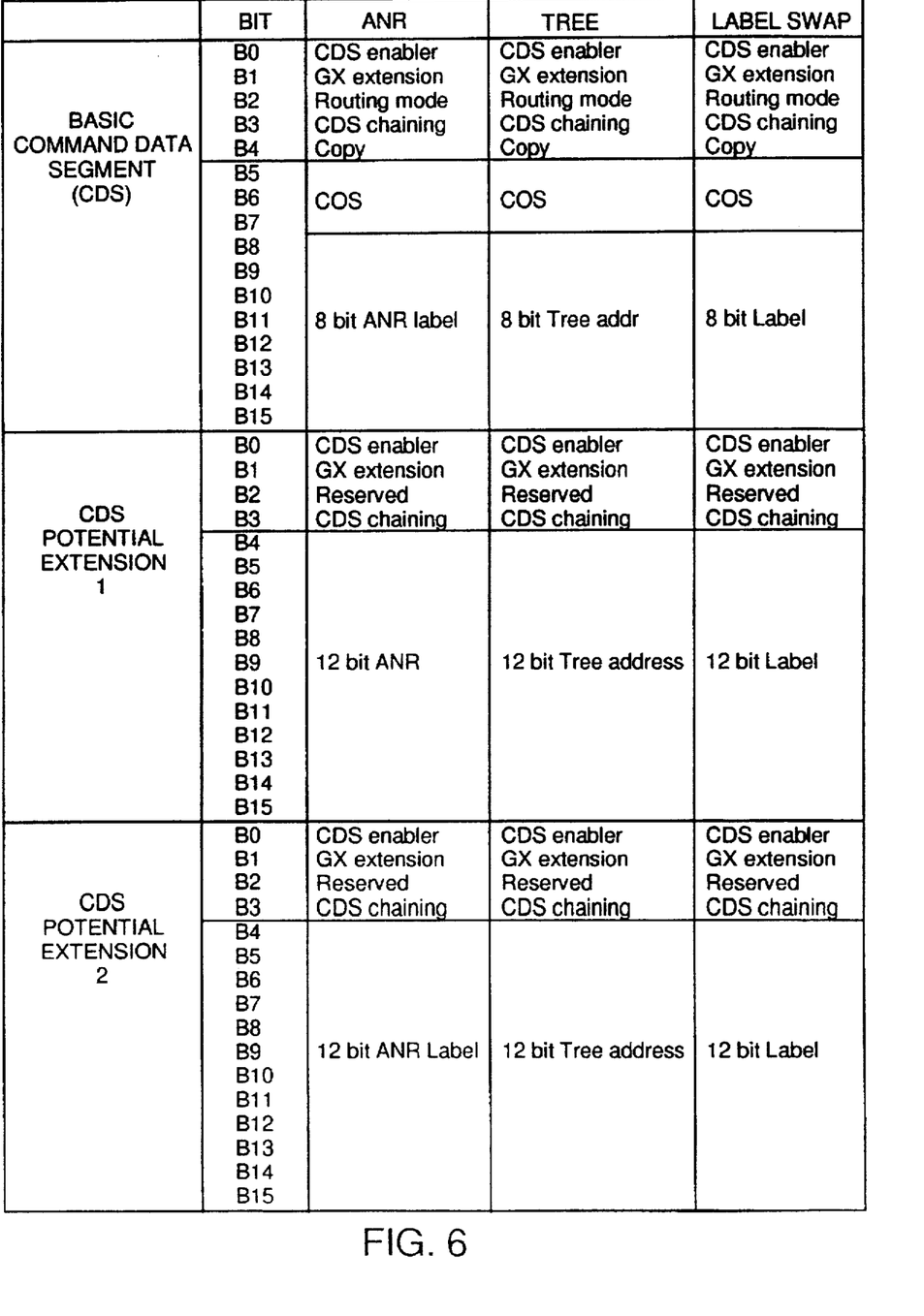
FIG. 6 shows a generic header with three command/data segments.

Referring to FIG. 6, each command/data segment contains 5 generic bits, and a 1 byte routing field:

Generic bits

Bit 0: (Command disabled)
1: the command has been processed by a previous node.
Bit 1: (Generic extension)
1: This CDS is extended with 1 CDS, in sequence.
Bit 2: (Command type)
1: explicit routing
0: implicit routing
This bit is present only in the basic CDS. In the extended CDS's, it is reserved for future use.
Bit 3: (Command chaining)
1: a CDS follows
0: end of chain
This bit is present only in the basic CDS.
Bit 4: (Copy)
1: copy the information field in this node
The copy address is given by the last segment of the chain in the following CDS.
This bit is present only in the basic CDS.
Bit 5 to 7: (Class of service)
Same meaning as the class of service bits in the current header (c1–c3). In case of extended CDS's, these bits appear only in the first or basic CDS.

Routing field

Bit 8 to 15: (Label)
1 byte label, which can be extended by the generic extension bit.

FIG. 6 shows the format of the header for explicit and implicit routing. The explicit routing case assumes ANR routing. The implicit routing case assumes that either label swapping or tree routing has been selected at the set-up phase.

The figure shows the bit allocation in each case, assuming that the CDS has been extended twice (one basic CDS and two extension CDS's). The address length in this example, is 32 bits (8+12+12) for ANR, 32 bits (8+12+12) for label swapping and 32 bits (8+12+12) for tree routing. This length can be extended by concatenation of additional CDS's. In practice however, the basic addressing can be implemented with one CDS for ANR (1 byte ANR), one CDS for label swapping (1 byte label), and 2 CDS's for tree (20 bit tree address).

When a packet is routed using the explicit routing mode, the label (ANR) is processed in an input trunk adapter to route the packet to an output trunk adapter.

Stripping of an used ANR label is no-longer necessary since the corresponding CDS is just disabled by setting bit 0 to 1. As a result, the packet size remains constant and the processing complexity is reduced.

The reverse path accumulation is an optional function, that consists in inserting the ANR label of the input adapter in the address field, in order to build up the reverse ANR string along the route. This function is mainly used for network control.

In the case of reverse path accumulation, it would be interesting to systematically overwrite the ANR label with the reverse ANR label, at each node. The problem is that the ANR label is defined with 1 or 2 bytes, and a given node includes trunks having different length ANR labels. For example, the input trunk ANR label might be defined with 2 bytes, while the output trunk ANR label is defined with 1 byte. The straight overwriting operation is not possible.

One can easily overcome this theoretical limitation as follows. After the route has been computed at the origin node, the ANR label of each link of the reverse route is extracted from the topology data base. The reverse ANR label is compared to the direct ANR label. If they have the same length, or if the reverse ANR label is smaller than the direct ANR label, no action is taken. Else, a dummy CDS is concatenated to the direct ANR label to reserve space for overwriting the reverse ANR label. This CDS has its command disabled bit (generic bit 0) set to 1.

The copy function will now be illustrated in the case of implicit and explicit routing modes. As mentioned before, the copy function is enabled in each CDS, by the generic bit 4. The copy address is given by the last segment of the chain, which can optionally be extended to more than 1 copy address.

In the case of implicit routing, the header includes 1 CDS with possible extensions for the label. When the copy bit is set up in this CDS, it means that a CDS including the copy address follows. This second CDS may be extended to include a second copy address.

Figure 7:
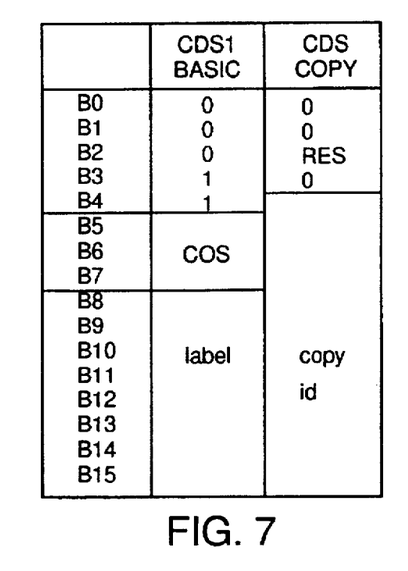
FIG. 7 illustrates the copy function in the case of implicit routing.

For example, assume that a packet is routed through two nodes, that the label is defined with 8 bits, and that the packet should be copied to one copy address. Then, the generic bits of each CDS of the packet would be, at the origin, as shown in FIG. 7.

In the case of explicit routing, the header includes N CDS's with possible extensions for the labels. These CDS's are chained by setting the chaining bit to 1 for all CDS's except for the last one. When the copy bit is set up in one of these CDS's, it means that a CDS including the copy address follows the last routing CDS. Again, this CDS may be extended to include a second copy address.

Figure 8:
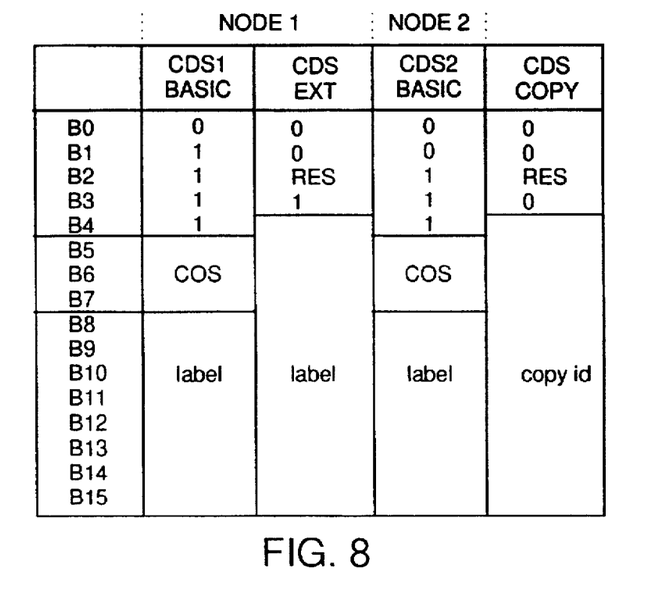
FIG. 8 illustrates the copy function in the case of explicit routing.

For example, assume that the header includes 2 ANR's, the first one being defined with 2 bytes, the second one being defined with 1 byte. Also assume that the reverse ANR's labels are of the same length, and that the packet should be copied to copy id. Then, the generic bits of each CDS of the packet would be, at the origin, as shown on FIG. 8.

Figure 9A:
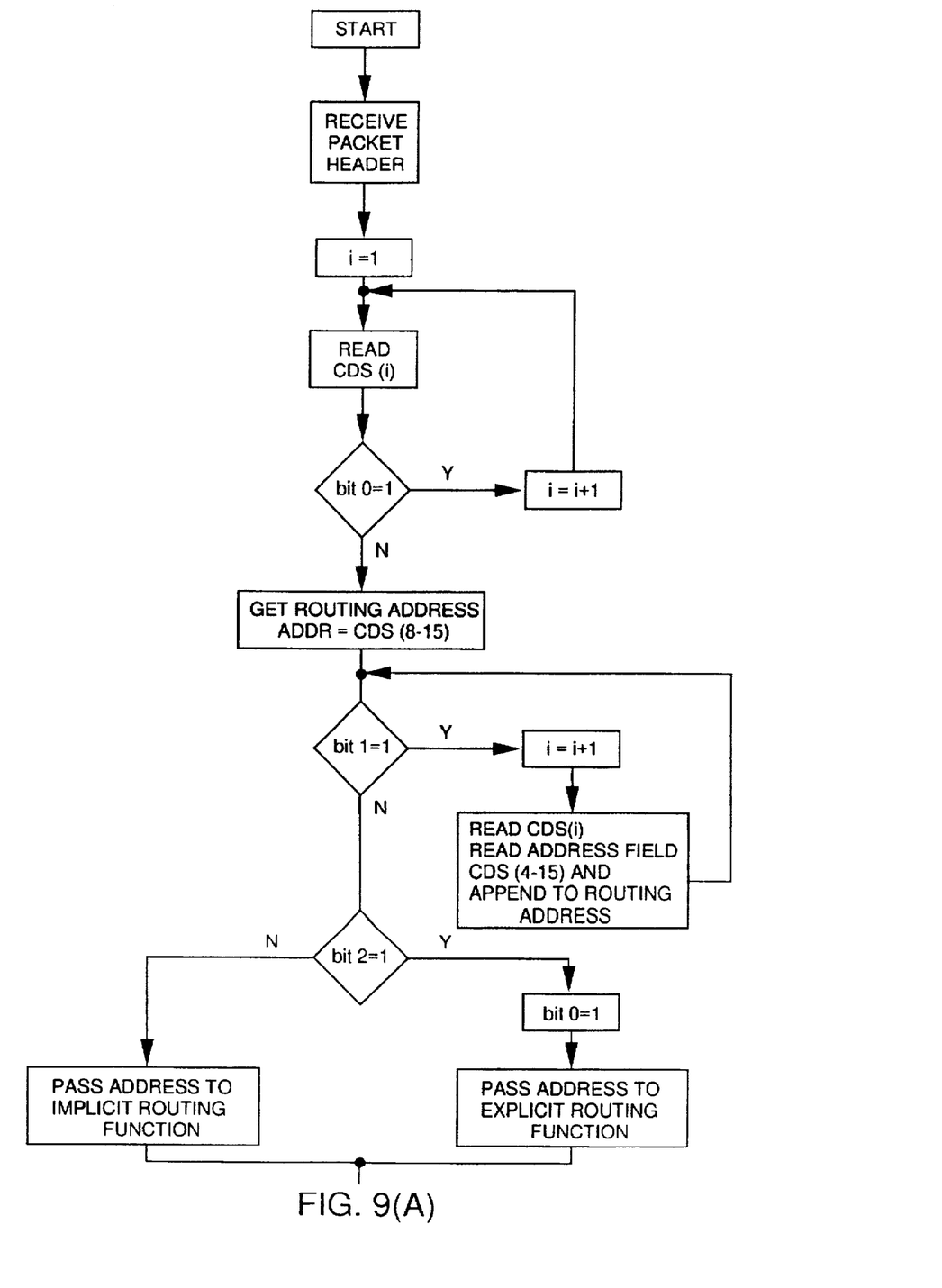
FIGS. 9A–9B is a flow diagram describing how the copy function would be processed in a typical node of the communication network.
Figure 9B:
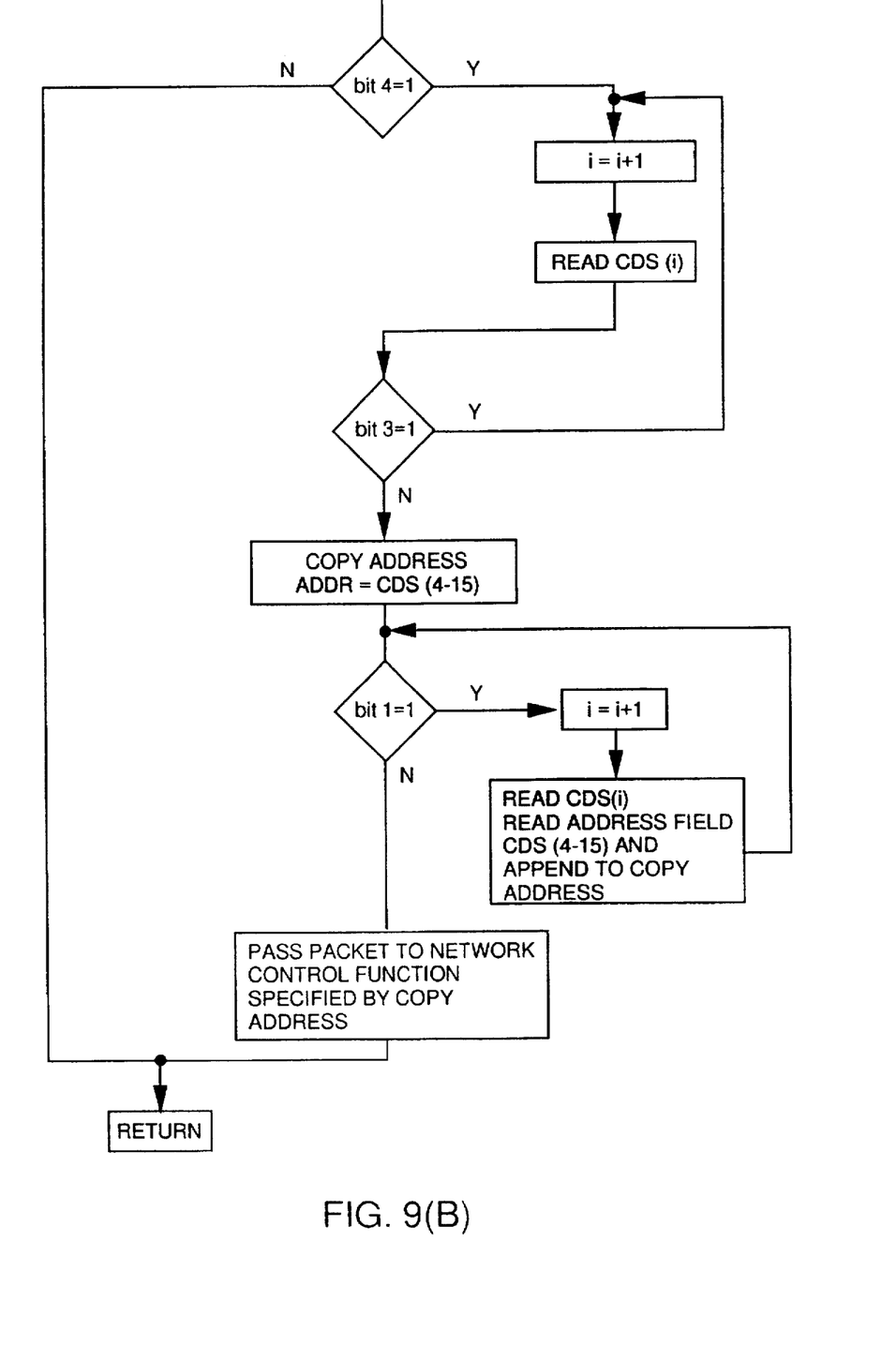

FIG. 9 is a flow diagram showing the process of receiving and processing a packet containing a copy bit in the case of the generic header according to the invention. The packet is received by an incoming adapter. The processor then first examines the packet header and makes a determination as to whether the command has been processed by a previous node. If this is not the case, the routing address is first extracted, then the extension bit is tested to determine whether the current CDS is extended with additional routing address bits. The processor then determines whether explicit or implicit routing is specified. In the next step the processor determines whether the copy bit is set up. If the answer is no, the packet continues through the node and no more processing is performed by the processor. If the answer is yes, the last CDS of the chain is searched to get the copy address. The packet is then passed to the network control control function corresponding to this address.

As a result of the new structure of the header, it appears that the generic header can be implemented with a simpler hardware than the current header. In the case of the current header, the process consists in the analysis of multiple variable length fields. The data stream is pipelined through a delay line, and the hardware analyses in parallel several fields of the header to make its decisions. In the case of the generic header, the process consists in an analysis of the successive fixed length CDS's. The data stream is pipelined through a delay line.

For each CDS, a single bit is tested (enable bit). If it is disabled, no process is done, and the next CDS is tested. The hardware detects the first enabled CDS of the chain, and then processes it. For example in case of no CDS extension, i.e. in most cases of ANR and label swapping routing modes, this CDS is the only fixed length piece of information to be processed at a each node. This simple analysis shows that the basic processing is simpler in the case of the generic header, and does not require complex memory accesses. This advantage of the homogeneous header structure conceptually drives a simpler implementation either in hardware or software.

We claim:

1. For use in a fast packet switching network used for transporting digital data packets, each packet having a header structure which includes a plurality of command and data segments, each with a disable indicator and one or more control bits, said network having a plurality of switching nodes interconnected by transmission links, a method of processing packets, said method being implemented at one or more of the switching nodes and including the steps of:

receiving packets from other switching nodes over the transmission links;

detecting the state of the disable indicator in each of the command and data segments in the header structure of each received packet;

passing over any command and data segment having a disable indicator having a predetermined first value; and performing predetermined operations on the packet in accordance with the control bits found in the first command and data segment encountered having a disable indicator having a predetermined second value.

2. A method as set forth in claim 1 further including the step of setting, to the predetermined first value, the disable indicator in a command and data sequence which has been used in controlling the performance of packet operations.

3. In a fast packet switching network to be used for transporting digital data packets, each packet having a header structure which includes a plurality of command and data segments, each with a disable indicator and one or more control bits, said network having a plurality of switching nodes interconnected by transmission links, each switching node including:

means for receiving packets from other switching nodes over the transmission links;

means for detecting the state of the disable indicator in each of the command and data segments in the header structure of each received packet;

means for passing over any command and data segment having a disable indicator having a predetermined first value; and means for performing predetermined operations on the packet in accordance with the control bits found in the first command and data segment encountered having a disable indicator having a predetermined second value.

4. A switching node as set forth in claim 3 further including means for setting, to the predetermined first value, the disable indicator in a command and data sequence which has been used in controlling the performance of packet operations.

* * * * *